Figure 3:
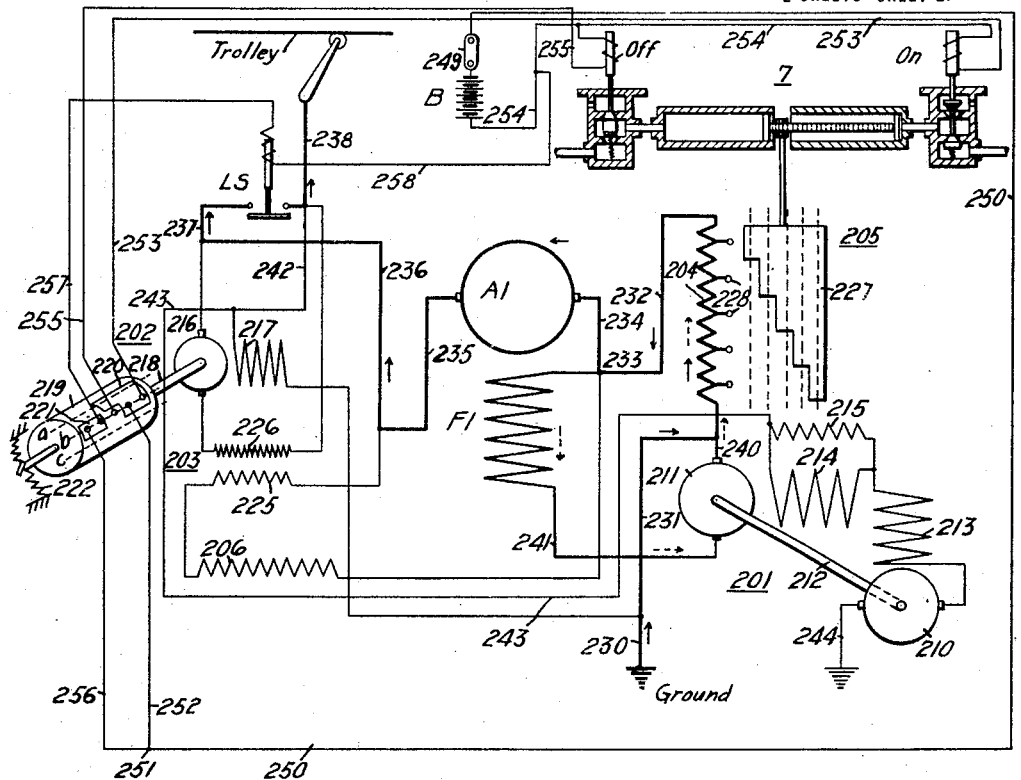

R. E. HELLMUND.
SYSTEM OF CONTROL.
APPLICATION FILED SEPT. 7, 1917.
1,361,994.
Patented Dec. 14, 1920.
2 SHEETS—SHEET 1.
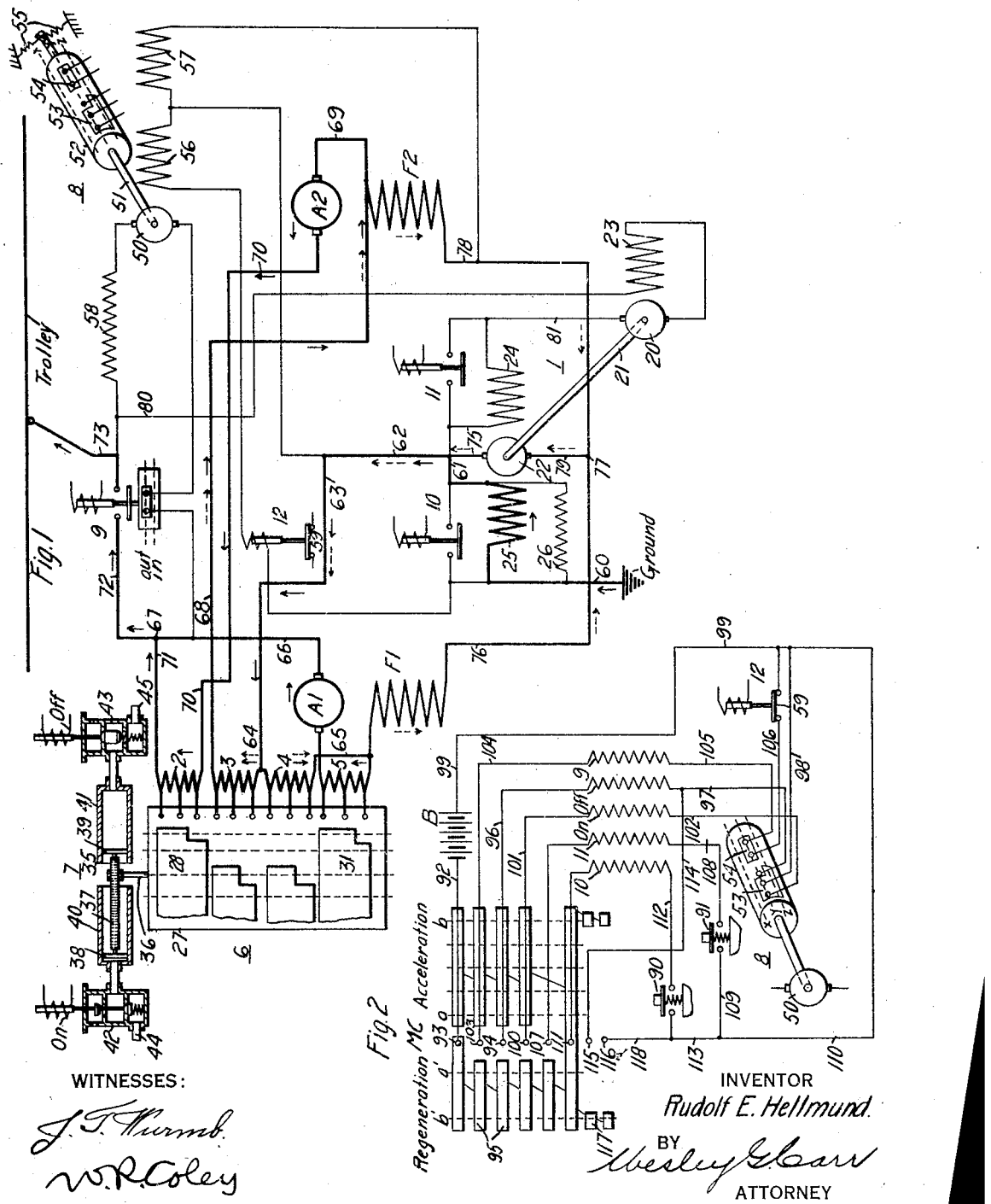
WITNESSES:
INVENTOR
Rudolf E. Hellmund.
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,361,994.  Specification of Letters Patent.  Patented Dec. 14, 1920.

Application filed September 7, 1917. Serial No. 190,135.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification.

My invention relates to systems of control and especially to the automatic control of electric railway vehicles, and the like, under coasting conditions.

The object of my invention is to provide a system of the above-indicated character which shall be relatively simple in arrangement and reliable in operation, wherein the main-machine field excitation shall be automatically varied to produce a predetermined relation of supply-circuit voltage and machine voltage under normal-speed coasting conditions, and wherein such automatic variation shall be inherently counteracted under relatively high-speed coasting conditions.

A further object of my invention is to combine, with the previously outlined system, relay means for preventing the connection of the machine to the supply circuit during the coasting period until substantially stable main-field excitation conditions obtain.

My invention may best be understood by reference to the accompanying drawing, wherein Figure 1 is a diagrammatic view of the main circuits of a system of control embodying the invention; Fig. 2 is a diagrammatic view of an auxiliary governing system for the main circuits that are shown in Fig. 1; and Fig. 3 is a diagrammatic view of a modified system embodying my invention.

Referring to Fig. 1 of the drawing, the system shown comprises supply-circuit conductors Trolley and Ground; a plurality of main dynamo-electric machines respectively having commutator-type armatures A1 and A2 and field windings F1 and F2 of the series type; a motor-generator set 1 or the like that is driven from the supply circuit for the purpose of providing an auxiliary excitation for the main field windings; a plurality of resistors 2, 3, 4 and 5, which are connected in circuit in a manner to be described and which may be varied in active-circuit value by means of a controller 6 having an actuating mechanism 7; a torque-motor relay device 8 for the purpose of automatically regulating certain machine circuits in accordance with the relation of supply-circuit voltage to main-machine voltage during the coasting period; a plurality of switches 9, 10 and 11 for effecting certain main and auxiliary circuit connections; and a main-field-flux relay 12 for a purpose to be set forth.

The motor generator set 1 comprises a driving or motor armature 20, upon the shaft 21 of which an exciting or generator armature 22 is also mounted. A series-related field winding 23 is provided for the driving armature 20, while the exciting armature 22 has a plurality of field windings 24 and 25 cumulatively-related during regeneration, which are respectively energized in accordance with the load current of the motor-generator set and the main-armature current. The main-current-excited field winding 25 is preferably shunted by a resistor 26, and the switch 10, when closed, is adapted to short circuit the field winding. The switch 11 performs a similar function with respect to the allied auxiliary field winding 24.

The controller 6 preferably comprises a drum body 27 upon which are mounted a plurality of contact segments 28, 29, 30 and 31 for gradually varying the active-circuit values of the resistors 2, 3, 4 and 5 in accordance with the movements of the controller.

The actuating mechanism 7 for the controller 6 is of a familiar electrically-controlled, pneumatically-operated type, comprising a pinion 35 which is secured to the operating shaft 36 of the controller to mesh with a horizontally-movable rack member 37, the opposite ends of which constitute pistons 38 and 39 that travel within appropriate operating cylinders 40 and 41, respectively. A normally closed valve 42, having an actuating coil "On," is associated with the outer end of the cylinder 40, while a normally open valve 43, having an actuating coil "Off," effects communication with the outer end of the other cylinder 41. A plurality of supply pipes 44 and 45 respectively convey fluid pressure to the valves 42 and 43 from any suitable source (not shown).

The mechanical operation of the device just described may be set forth as follows. By reason of the normal admission of fluid pressure to the cylinder 41, the apparatus is initially biased to the illustrated position. Upon the concurrent energization of the actuating coils On and Off, such initial unbalanced fluid-pressure conditions are reversed; that is, fluid pressure is admitted through the valve 42 to the cylinder 40 and is exhausted from the cylinder 41 through the valve 43 to the atmosphere. Consequently, a movement of the controller 6 (in the illustrated case toward the right) ensues. To arrest such movement at any time, it is merely necessary to deënergize the off coil, whereupon balanced high-pressure-fluid conditions exist in the mechanism, and a positive and reliable stoppage thereof is effected.

To produce a return movement of the apparatus, the actuating coils On and Off are concurrently deënergized, whereby fluid-pressure conditions revert to the original state and the desired backward movement is effected.

The torque-motor relay device 8 comprises an armature winding 50, upon the shaft 51 of which is mounted a small drum or cylinder 52 that carries a plurality of contact segments 53 and 54 of appropriate configuration for effecting certain auxiliary-circuit connections, to be subsequently described, in accordance with the occupation of its positions $x$, $y$ and $z$ by the relay device. A plurality of centering springs 55 bias the relay device 8 to its illustrated intermediate position $y$. An exciting field winding, having a plurality of sections 56 and 57, is provided for the relay armature 50, the sections 56 and 57 being respectively connected across the main-current-excited field winding 25 of the exciting armature 22 and across the armature 22 itself.

The field-winding sections 56 and 57 are differentially related for a purpose to be set forth, the unidirectionally excited section 57 normally predominating. The relay armature 50 is connected through a voltage-reducing resistor 58 and an electrical interlock 9-out, of a familiar type, across the terminals of the switch 9, whereby the armature 50 receives the difference between the supply-circuit voltage and the main-machine voltage during the coasting period and is consequently actuated in the one or the other direction in accordance with the temporarily greater voltage. The relay device 8 is adapted to govern the actuating mechanism 7 for the controller 6, thus serving to vary the illustrated circuit connections in accordance with the relation of the two voltages just mentioned.

The solenoid-type main-field-flux relay 12 has its actuating coil connected in series relation with the main-current-excited field winding 25 for the generator armature 22 and with the section 56 of the torque-motor relay-device field winding. The relay 12 is thus energized in accordance with the voltage fluctuations or changes of the auxiliary field winding 25, which fluctuations occur synchronously with the changes of main-field-winding-flux. Such changes occur, to a considerable degree, during the preliminary regulating period prior to connection of the main machine to the supply circuit, and the object of the relay 12 is to prevent such connection until main-field-flux conditions, as reflected by the voltage across the main-current-excited field winding 25, are substantially stable. The main-field-flux relay 12 is provided with a bridging contact member 59 for closing, in its lower position, certain auxiliary circuits to be described.

Assuming that regenerative operation, for example, has been begun, the various circuit connections may be traced as follows. The main-armature or regenerative circuit, indicated by the solid arrows, is established from the supply-circuit conductor Ground through conductor 60, the exciting field winding 25 for the generator armature 22, conductors 61, 62 and 63 and junction-point 64, where the circuit divides, one branch including stabilizing resistor 4, conductor 65, accelerating resistor 5, main armature A1 and conductor 66 to a second junction-point 67, and the other branch traversing stabilizing resistor 3, conductors 68 and 69, main armature A2, conductor 70, accelerating resistor 2, and conductor 71 to the junction-point 67, whence a common circuit is completed, through conductor 72, switch 9, and conductor 73, to the trolley.

The exciting or main-field-winding circuit, indicated by the dotted arrows, is established from the positive terminal of the exciting armature 22 through conductors 75, 62 and 63, to the junction-point 64, where the circuit divides, one branch traversing stabilizing resistor 4, conductor 65, main field winding F1, and conductor 76, to another junction-point 77, and the other branch including stabilizing resistor 3, conductor 68, main field winding F2 and conductor 78 to the junction point 77, whence circuit is completed through conductor 79 to the negative terminal of the generator armature 22.

An auxiliary circuit is established from the trolley conductor 73 through conductor 80, field winding 23 and auxiliary exciting armature 20, conductor 81, exciting field windings 24 and 25 for the generator armature 22, and thence, through conductor 60, to ground.

The main armatures A1 and A2 are thus connected in series relation with the pairs of resistors 4 and 5, and 2 and 3, respectively, the two main-armature circuits being connected in parallel relation across the supply circuit. The exciting armature 22 is connected to send current through the stabilizing resistors 3 and 4 in the same direction as the corresponding main-armature current, while the main field windings F1 and F2 are energized solely from the exciting armature 22.

Reference may now be had to Fig. 2, wherein the auxiliary governing system shown comprises the actuating coils of the switches 9, 10 and 11, the actuating coils On and Off, the auxiliary contact members of the torque-motor relay device 8 and of the main-field-flux relay 12, together with a master controller MC and a suitable source of auxiliary energy, such as a battery B, for primarily governing the control system, and a plurality of push buttons 90 and 91, or the like, for permitting a certain manual regulation of the system, irrespective of the operating position of the master controller.

Assuming that the main machines have been accelerated and are now coasting under transitory normal-speed conditions, in preparation for machine operation, regeneration may be effected by actuating the master controller MC to its initial regenerative position $a'$, whereby certain auxiliary circuits to be traced are closed in accordance with the position of the torque-motor relay device 8.

Whenever the supply-circuit voltage is temporarily greater than the momentum-driven machine voltage, the resultant traversal of current through the armature 50 of the torque-motor relay device 8 causes the relay device to move to its position $z$, whereby one auxiliary circuit is established from the positive terminal of the battery B through conductor 92, control fingers 93 and 94, which are bridged by contact segment 95 of the master controller, conductor 96, the actuating coil Off, conductor 97, contact segment 53 of the relay device 8, and conductors 98 and 99 to the negative terminal of the battery B.

A similar circuit is completed from the contact segment 95 of the master controller, through control finger 100, conductor 101, actuating coil On, conductor 102, and thence, through one contact segment 53 of the relay device 8, as just traced. By reason of such concurrent energization of the actuating coils On and Off, a forward movement of the controller 6 occurs to initially exclude the accelerating resistors 2 and 5 from the circuits of the respective armatures and, subsequently, to gradually reduce the active-circuit values of the stabilizing resistors 3 and 4, whereby the voltage of the main machines is increased to a value approximately equal to that of the supply-circuit voltage, dependent upon the design of the component elements of the system.

On the other hand, whenever the machine voltage, during transitory normal-speed coasting conditions, temporarily predominates over the supply-circuit voltage, the consequent reversal of current through the armature 50 of the relay device 8 causes the relay device to be actuated to its position $x$, wherein the energizing circuits for the actuating coils On and Off are both interrupted to effect a return movement of the controller 6 in accordance with the previously described principles, thereby gradually increasing the active-circuit values of the resistors 2, 3, 4 and 5 and, consequently, reducing the main-machine voltage to the desired value.

When the supply-circuit voltage and the main-machine voltage have attained the desired approximately equal relation, the torque-motor relay device 8 occupies its intermediate position $y$, and, as soon as main-field-flux conditions have become substantially stable to permit the relay 12 to assume its lower position, a further auxiliary circuit is completed from the contact segment 95 of the master controller through control finger 103, conductor 104, the actuating coil of the line switch 9, conductor 105, contact segment 54 of the relay device 8, conductor 106, bridging contact member 59 of the main-field-flux relay 12, and conductor 99 to the negative battery terminal.

If desired, the closure of the line switch 9 may be utilized to open the circuit of the relay armature 50 through the agency of the electrical interlock 9-out, whereby the relay device remains in its intermediate position and no current traverses the relay armature.

Under normal accelerating or regenerative conditions, the main-field-flux relay 12 will remain in its lower circuit-closing position to maintain the closed condition of the line switch 9, although, if desired, an electrical interlock 9-in, of the well-known type similar to that illustrated, may be employed to bridge the auxiliary contact members of the relay 12.

Assuming that, by reason of descending a grade during the transitory coasting period, the momentum-driven machines attain a relatively high speed and that it would involve a heavy surge of current and possible injury to the machines to connect them to the supply circuit under such high-speed conditions, the torque-motor relay device 8 will inherently operate to prevent such connection.

Although, under the high-speed conditions mentioned, an excessive machine voltage will result as soon as the main field windings are fully energized, nevertheless, initially, the supply-circuit voltage is greater than the machine voltage, which tends to move the torque-motor relay device 8 in the direction to reduce the active-circuit values of the resistors 2, 3, 4 and 5 and thus strengthen the main field excitation, whereas a weakening thereof is, in fact, necessary. If the switch 11 is opened to insert the auxiliary field winding 24 in circuit and thus build up the voltage of the generator armature 22, the section 57 of the field winding for the torque-motor relay device 8 is at first weakly energized, while the differentially-related section 56 is rather strongly excited by reason of the changes of field-flux conditions that occur in the auxiliary field winding 25 for the generator armature 22. The resultant excitation of the relay armature 50 is either sufficient to maintain the relay device in its intermediate position or it is actuated in the opposite direction toward its position $x$ to weaken the main field excitation, as desired. By reason of this inherent counteracting effect in the torque-motor relay device 8 under relatively high-speed coasting conditions, the connection of the main machines to the supply circuit is prevented until electrical conditions in the main machine are entirely suitable therefor.

If it is desired to short-circuit the main-current-excited field winding 25 for the exciting armature 22 during regular operation of the main machines and thus employ the auxiliary field winding only during the transitory regulating period, such action may be accomplished by actuating the push-button 91 to, and suitably holding it in, its lower or closed position, whereby a circuit is completed from the contact segment 95 of the master controller through control finger 107, the actuating coil of the switch 11, conductor 108, push-button 91 and conductors 109 and 110 to the negative conductor 99.

Furthermore, it is preferable to short-circuit the allied auxiliary field winding 24 during the general coasting period and thus reduce the energy losses of the motor-generator set. Such a result may be effected by closing the push-button 90, whereby the circuit is completed from the contact segment 95 of the master controller in its off position through control finger 111, the actuating coil of the switch 10, conductor 112, push-button 90 and conductor 113 to the negatively-connected conductor 110.

To effect further regulation of the controller 6, after the main machines have been connected to the supply circuit, the master controller may be moved to its position $b'$, whereby a new circuit is completed from the lower terminal of the off coil, through conductor 114, control fingers 115 and 116, which are bridged by contact segment 117 of the master controller, and conductor 118 to the conductor 113 and thence to the negative battery terminal. By thus intermittently energizing the off coil, a forward step-by-step movement of the controller 6 may be effected to gradually reduce the active-circuit value of the resistors 2, 3, 4 and 5 and thus compensate for the gradual decrease of speed during the retardation period.

Inasmuch as the accelerating operation of the system is similar to that previously set forth and will be readily understood by those skilled in the art, no detailed exposition thereof is deemed necessary.

In lieu of employing the auxiliary field winding 25 for the purpose of preventing the connection of the main machines to the supply circuit until main-field-excitation conditions are relatively stable, it will be understood that other equivalent circuit connections may be employed, if desired. For example, an auxiliary coil wound upon the polar projections of one of the main machines may be substituted for the auxiliary field winding 25. In this case also, flux changes of the main field winding will be reflected in the auxiliary coil to maintain the relay 12 in its upper or open-circuit position until the desired stable conditions obtain.

Furthermore, the desired torque-relay action may be obtained by interchanging the connections of the relay armature 50 and field-winding section 57.

Reference may now be had to Fig. 3, wherein the system shown comprises the supply-circuit conductors Trolley and Ground and a main dynamo-electric machine having an armature A1 and field winding F1; together with an auxiliary motor-generator set 201; a torque-motor relay device 202; a shunt transformer 203; a stabilizing resistor 204, which may be varied in active circuit value by means of a controller 205 having the previously-described actuating mechanism 7; an auxiliary-circuit resistor 206; a line-switch LS; and an auxiliary source of energy, such as the battery B.

The motor-generator set 201 is shown as comprising a driving or motor armature 210; a generator or exciting armature 211 which may be coupled to the driving armature by a shaft 212, for example; a series-related field winding 213 for the driving armature and a field winding 214 for the exciting armature 211, the field winding 214 being shunted by a surge-absorbing resistor 215 and being connected in series relation with the auxiliary driving motor.

The torque-motor relay device 202 comprises a commutator-type armature 216 and a supply-circuit-excited field winding 217 therefor. The relay shaft 218 carries a small drum or cylinder 219 upon which are mounted a plurality of auxiliary-circuit contact segments 220 and 221 for effecting various circuit connections to be set forth, in accordance with the occupation of positions $a$, $b$ or $c$ by the relay device. A plurality of centering springs 222 bias the relay to its illustrated intermediate position $b$.

The transformer 203 comprises a primary winding 225 that is connected through the voltage-reducing resistor 206 across the main armature A1 and a secondary winding 226 that is connected in series relation with the armature 216 of the torque-motor relay device across the line switch LS.

The relay armature 216 thus receives the difference of supply-circuit voltage and main-armature voltage during the coasting period, and is concurrently energized in accordance with the rate and direction of change of the main field flux or armature voltage by reason of the circuit connection of the transformer 203, as hereinafter set forth in detail.

The two transformer windings are wound to oppose each other and consequently, under conditions of a relatively rapid increase or decrease of the difference between the supply-circuit voltage and the armature voltage, the main-field-winding flux, as reflected in the primary transformer winding 225, quickly increases in the one or the other direction to thus inherently introduce a voltage opposing the relay-armature voltage in the secondary transformer winding 226, for a purpose to be set forth.

The controller 205 is provided with a multiposition contact segment 227 for successively engaging a plurality of control fingers 228 that are connected to predetermined points of the stabilizing resistor 204, whereby the resistor may be gradually excluded from circuit during the regenerative period to increase the main-field-winding excitation and compensate for the gradual decrease of main-machine speed.

Assuming that the line switch LS has been closed, the main-armature or regenerative circuit, indicated by the solid arrows, is established from the supply-circuit conductor Ground through conductors 230, 231 and 232, junction-point 233, conductor 234, main armature A1, conductors 235, 236 and 237, line switch LS, and conductor 238 to the trolley.

The exciting or main-field-winding circuit is established from the positive terminal of the auxiliary generator armature 211 through conductor 240, stabilizing resistor 204, conductor 232, junction-point 233, main field winding F1 and conductor 241 to the negative terminal of the exciting armature.

An auxiliary circuit is completed from the trolley through conductors 238, 242 and 243, field windings 214 and 213 for the auxiliary armatures 211 and 210, respectively, the auxiliary driving armature 210 and conductor 244 to ground.

Under transitory coasting conditions of the main machine, when the line switch LS is open and just prior to the connection of the machine to the supply circuit, the controller 205 is automatically governed by the torque-motor relay device 202 to maintain a balance of the supply-circuit voltage and the main-armature voltage in the following manner: If the supply-circuit voltage temporarily exceeds the main-armature voltage, the relay device 202 is actuated to one extreme position $a$ to complete a circuit from the positive terminal of the battery B through hand-switch 249 and conductor 250 to a junction-point 251, where the circuit divides, one branch including conductor 252, contact segment 220 of the torque-motor relay device in position $a$, conductor 253, the actuating coil "On" for the controller 205 and conductor 254 to the negative battery terminal. Another circuit is continued from the contact segment 220 through conductor 255 and the actuating coil "Off" to the negative conductor 254.

Since both actuating coils for the operating mechanism 7 are concurrently energized, forward movement of the controller 205 occurs to gradually short-circuit the stabilizing resistor 204 and thus increase the main-field-winding excitation and the main-armature voltage.

On the other hand, if the main-armature voltage temporarily predominates over the supply-circuit voltage, the torque-motor relay device 202 is actuated to its other extreme position $c$, whereby both actuating coils "On" and "Off" are deënergized to effect a backward movement of the controller 205 and thus weaken the main field excitation and reduce the main-armature voltage to the desired value.

One of the advantages of the present system is that it effects a reduction in the time-element necessary for balancing the supply-circuit voltage against the main-armature voltage during the coasting period before connection of the machine to the supply circuit, and in this respect the system of Fig. 3 is an improvement over the previously-described system that is shown in Fig. 1. Whereas, in the system first described, overshooting of the controller for governing the main field-excitation could occur, thus delaying the desired balanced condition of the supply-circuit voltage and the main-armature voltage, in the present system such undesirable operation is effectively avoided and, moreover, the transformer 203 actually operates to expedite the arrival at a balanced-voltage condition in the following way.

Assuming, for instance, that the main-machine voltage during the coasting period is quickly rising toward a value equal to the supply-circuit voltage, a correspondingly increased current traverses the primary winding 226 of the transformer to cause an increase of flux in a certain direction in the secondary winding 225, which is connected in circuit to oppose the voltage of the relay-device armature 216. The relay-armature voltage, in this way, will decrease to substantially zero value before the main-armature voltage actually equals the supply-circuit voltage. Thus, the torque-motor relay device will assume its intermediate position to close the line switch, in accordance with the circuit about to be traced, without causing unnecessary regulation of the controller 205, whereby the total time-interval necessary for connecting the main machine to the supply circuit after movement of a governing controller by the train operator is reduced to a relatively small value.

The auxiliary circuit just mentioned for effecting the closure of the line switch is established from the positively-energized conductor 250 through conductor 256, contact segment 221 of the relay device in its intermediate position $b$, conductor 257 and the actuating coil of the line switch LS to the negative conductor 254.

On the other hand, if the main-armature voltage is assumed as already above the line voltage and as rapidly increasing to a still greater value, the resultant increase of flux in the transformer 203 acts in the opposite direction, since the relay-armature voltage is now of the opposite polarity from the case previously assumed, to again oppose the difference of supply-circuit and main-armature voltage, that is, the voltage of the relay armature 216, and thus rapidly bring about the desired balanced-voltage conditions that cause the closure of the line switch.

Two other cases may arise: namely, a rapid decrease of main-field flux to vary the main-armature voltage either away from or toward the concurrent value of supply-circuit voltage. In the former case, the relay-armature voltage is positive with respect to the supply circuit and will be inherently decreased by the action of the transformer 203, and in the latter case, the relay armature voltage, of the opposite polarity, will again be opposed or decreased by such inherent action. In other words, the illustrated combination of torque relay and transformer inherently acts under all transitory coasting conditions just prior to the connection of the main machine to the supply circuit to expedite the desired balanced-voltage conditions and the closure of the line switch, by always opposing the relay-armature voltage irrespective of its polarity.

After the closure of the line-switch, the relay device 202 remains in its mid-position, whereby the circuit of the "off" coil is deenergized to cause the controller 205 to remain stationary. Subsequent regulation of the controller to compensate for the decrease of vehicle speed may be accomplished by the addition of suitable auxiliary circuits, as will be understood by those skilled in the art, without further description.

It will be appreciated that other equivalent connections of the transformer 203 may be employed for decreasing the above-mentioned time-interval for balancing the desired voltages. For example, the primary transformer winding 226 may be connected across the main field winding F1, while the secondary transformer winding 225 may be connected in series relation with the field winding 217 for the torque-motor relay device. Consequently, I do not wish to be restricted to the specific circuit connections or arrangement of parts herein set forth, as various other modifications thereof may be effected without departing from the spirit and scope of my invention. I desire, therefore, that only such limitations shall be imposed as are indicated in the appended claims.

I claim as my invention:

1. In a system of control, the combination with a supply circuit and a dynamo-electric machine having an armature and a field winding, of means for varying the field excitation in accordance with predetermined machine conditions, and means for automatically counteracting said varying means under predetermined transitory machine conditions.

2. In a control system, the combination with a supply circuit and a dynamo-electric machine having an armature and a field winding, of means for varying the field excitation in accordance with the relation of supply-circuit voltage and armature voltage under certain transitory coasting conditions and for inherently effecting an action opposing said means under predetermined other transitory conditions.

3. In a control system, the combination with a supply circuit and a dynamo-electric machine having an armature and a field winding, of electrical relay means for varying the field excitation in accordance with the relation of supply-circuit voltage and armature voltage under certain transitory coasting conditions and for inherently introducing an opposing magneto-motive force in a winding of said relay means under predetermined electrical conditions of said field winding.

4. In a control system, the combination with a supply circuit and a main dynamo-electric machine having an armature and a field winding, of a torque-motor relay device having a coöperating armature and field winding for varying the main field excitation in accordance with the relation of supply-circuit voltage and main armature voltage under certain transitory coasting conditions and for inherently introducing an opposing magneto-motive force in a field winding of said relay device under predetermined varying conditions of the main-field winding flux.

5. In a system of control, the combination with a supply circuit and a dynamo-electric machine having an armature and a field winding, of a relay device for governing certain circuit connections of said machine in accordance with the relation of supply-circuit voltage and machine voltage, and a winding influenced in accordance with the main-field-winding flux for controlling said relay device.

6. In a system of control, the combination with a supply circuit and a dynamo-electric machine having an armature and a field winding, of means for varying the field excitation under certain transitory coasting conditions in accordance with the relation of supply-circuit voltage and machine voltage, and means for automatically counteracting such variation under certain other transitory coasting conditions.

7. In a system of control, the combination with a supply circuit and a dynamo-electric machine having an armature and a field winding, of relay means for varying the field excitation under normal-speed coasting conditions to produce a predetermined relation of supply-circuit voltage and machine voltage, and means for oppositely influencing said relay means to counteract such variation under relatively high-speed coasting conditions.

8. In a system of control, the combination with a supply circuit and a dynamo-electric machine having an armature and a field winding, of a torque-motor relay device for regulating the field excitation under normal-speed coasting conditions to produce a predetermined relation of supply-circuit voltage and machine voltage, and additional exciting means for said relay device for counteracting such regulation under relatively high-speed coasting conditions.

9. In a system of control, the combination with a supply circuit and a main dynamo-electric machine having an armature and a field winding, of an exciting machine for the main field winding, an auxiliary field winding for said exciting machine, and a torque-motor relay device having an armature and a plural-section field winding for automatically regulating the main field excitation under normal-speed coasting conditions to produce a predetermined relation of supply-circuit voltage and machine voltage, one section of the relay field winding being differentially energized from said field winding for the exciting machine.

10. In a system of control, the combination with a supply circuit and a dynamo-electric machine having an armature and a field winding, of means for varying the field excitation under transitory coasting conditions in accordance with the relation of supply-circuit voltage to machine voltage, a relay device normally acting in conjunction with said varying means for modifying certain circuit connections, and a winding energized in accordance with the main-field-winding flux for preventing such action of the relay device until main-field-winding conditions are substantially stable.

11. In a system of control, the combination with a supply circuit and a dynamo-electric machine having an armature and a field winding, of a torque-motor relay device for regulating the field excitation under normal-speed coasting conditions to produce a predetermined relation of supply-circuit voltage and machine voltage, a relay normally acting in conjunction with said varying means for effecting the connection of the machine to the supply circuit, and an auxiliary field winding energized in accordance with the main-field-winding flux for preventing such action of the relay until main-field-winding conditions are substantially stable.

12. In a system of control, the combination with a supply circuit and a main dynamo-electric machine having an armature and a field winding, of an exciting machine for the main field winding, an auxiliary field winding for said exciting machine, a torque-motor relay device having an armature and a field winding for automatically regulating the main field excitation under normal-speed coasting conditions to produce a predetermined relation of supply-circuit voltage and machine voltage, and a relay for governing certain circuit connections, said relay having an actuating coil connected in circuit with said field winding for the exciting machine and with the relay-device field winding.

13. In a system of control, the combination with a supply circuit and a dynamo-electric machine having an armature and a field winding, of means for varying the field excitation under normal-speed transitory coasting conditions in accordance with the relation of supply-circuit voltage to machine voltage, a relay device normally acting in conjunction with said varying means for modifying certain circuit connections, a winding energized in accordance with the main-field-winding flux for preventing such action of the relay device until main-field winding conditions are substantially stable, and means for oppositely influencing said varying means under relatively high-speed coasting conditions.

14. In a system of control, the combination with a supply circuit and a dynamo-electric machine having an armature and a field winding, of a torque-motor relay device for regulating the field excitation under normal-speed coasting conditions to produce a predetermined relation of supply-circuit voltage and machine voltage, a relay normally acting in conjunction with said torque-motor relay device for effecting the connection of the machine to the supply circuit, an auxiliary field winding energized in accordance with the main-field winding flux for preventing such action of the relay until main-field-winding conditions are substantially stable, and additional exciting means for said relay device for counteracting said regulation under relatively high-speed coasting conditions.

15. In a system of control, the combination with a supply circuit and a main dynamoelectric machine having an armature and a field winding, of an exciting machine for the main field winding, an auxiliary field winding for said exciting machine, a torque-motor relay device having an armature and a plural-section field winding for automatically regulating the main field excitation under normal-speed coasting conditions to produce a predetermined relation of supply-circuit voltage and machine voltage, and a relay for governing the connection of the machine to the supply circuit in conjunction with said relay device and having an actuating coil connected in circuit with said field winding for the exciting machine and with a differentially-energized section of the relay-device field winding.

16. In a system of control, the combination with a supply circuit and a dynamo-electric machine, of a torque-motor relay device for governing certain machine connections, said device having one winding unidirectionally excited and having another winding excited in accordance with the difference of the supply-circuit voltage and the machine voltage.

17. In a system of control, the combination with a supply circuit and a dynamo-electric machine, of a torque-motor relay device for governing certain machine connections, said device having an armature winding excited in accordance with the difference of the supply-circuit voltage and the machine voltage and having a field winding provided with a plurality of sections that are respectively energized in accordance with the main-armature current and the main-field-winding voltage.

18. In a control system, the combination with a supply circuit and a dynamo-electric machine having an armature and a field winding, of means for varying the field excitation in accordance with the relation of supply-circuit voltage and armature voltage under certain transitory coasting conditions, and means for inherently opposing the action of said varying means under predetermined flux conditions of said field winding.

19. In a control system, the combination with a supply circuit and a dynamo-electric machine having an armature and a field winding, of means for varying the field excitation in accordance with the relation of supply-circuit voltage and armature voltage under certain transitory coasting conditions, and means connected to inherently effect an action opposing said varying means when the main-armature voltage value is relatively rapidly approaching toward, or receding from, the simultaneous supply-circuit voltage value.

20. In a control system, the combination with a supply circuit and a dynamo-electric machine having an armature and a field winding, of a torque relay device having one of its elements energized in accordance with the difference of supply-circuit voltage and armature voltage under certain transitory coasting conditions, means governed by said relay device for varying the field excitation, means dependent upon predetermined relay-device conditions for effecting the connection of said machine to the supply circuit, and a field winding connected to oppose the effect of said voltage difference under predetermined field-flux conditions.

21. In a control system, the combination with a supply circuit and a dynamo-electric machine having an armature and a field winding, of means for varying the field excitation in accordance with the relation of supply-circuit voltage and armature voltage under certain transitory conditions and also in accordance with the rate of change of main-field-winding flux under other transitory conditions.

22. In a control system, the combination with a supply circuit and a dynamo-electric machine having an armature and a field winding, of relay means for varying the field excitation in accordance with the relation of supply-circuit voltage and armature voltage under transitory coasting conditions accompanied by a relatively slow rate of change of the main field-winding flux and also in accordance with the rate of change of such flux under relatively rapidly changing conditions thereof.

23. In a control system, the combination with a supply circuit and a dynamo-electric machine having an armature and a field winding, of means for varying the field excitation in accordance with the relation of supply-circuit voltage and armature voltage under certain transitory coasting conditions, and means connected to inherently oppose the effect of the difference of such voltages irrespective of the polarity thereof in accordance with predetermined variations of field-winding flux.

24. In a control system, the combination with a supply circuit and a dynamo-electric machine having an armature and a field winding, of a torque relay device for varying the field excitation and having one of its component elements energized in accordance with the difference of supply-circuit voltage and main-armature voltage under certain transitory coasting conditions, and means connected to inherently oppose the effect of said difference irrespective of its polarity under conditions of a relatively rapid rate of change of the field-winding flux.

25. In a system of control, the combination with a supply circuit and a dynamo-electric machine, of means for regulating a machine circuit during predetermined stable relations of certain electrical conditions of said supply-circuit and said machine, and means for differently regulating said circuit during unstable transitory relations of said conditions.

26. In a system of control, the combination with a supply circuit and a dynamo-electric machine, of means for regulating a machine circuit during predetermined stable relations of the supply circuit and the machine voltages, and means for counteracting such regulation during unstable transitory relations of said voltages.

27. In a system of control, the combination with a supply circuit and a dynamo-electric machine having an armature and a field winding, of a relay device for regulating the field excitation during predetermined stable relations of the supply-circuit and the machine voltages and for counteracting such regulation during unstable transitory relations of said voltages.

28. In a system of control, the combination with a supply circuit and a dynamo-electric machine, of a torque-motor relay device having a coöperating armature and field winding for regulating a machine circuit during predetermined stable relations of the supply-circuit and the machine voltages, and means for counteracting such regulation during unstable transitory relations of said voltages.

In testimony whereof, I have hereunto subscribed my name this 30th day of August 1917.

RUDOLF E. HELLMUND.